US012609916B2

(12) United States Patent (10) Patent No.: US 12,609,916 B2
SeyedzadehDelcheh et al. (45) Date of Patent: Apr. 21, 2026

(54) PREGENERATION OF ONE-TIME PADS FOR END-TO-END ENCRYPTION

(71) Applicant: ADVANCED MICRO DEVICES, INC., Santa Clara, CA (US)

(72) Inventors: SeyedMohammad SeyedzadehDelcheh, Bellevue, WA (US); Sergey Blagodurov, Bellevue, WA (US); Donald Matthews, Jr., Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 283 days.

(21) Appl. No.: 18/208,082

(22) Filed: Jun. 9, 2023

(65) Prior Publication Data

US 2024/0414137 A1 Dec. 12, 2024

(51) Int. Cl.
*H04L 9/40* (2022.01)
(52) U.S. Cl.
CPC ................................ *H04L 63/0428* (2013.01)
(58) Field of Classification Search
CPC .................................................. H04L 63/0428
USPC ......................................................... 713/153
See application file for complete search history.

(56) References Cited

U.S. PATENT DOCUMENTS

| | | | |
|---|---|---|---|
| 10,542,036 B1 * | 1/2020 | Duane ................. | H04L 63/0838 |
| 12,294,645 B2 * | 5/2025 | Kunz .................... | H04L 9/0852 |
| 2015/0229614 A1 * | 8/2015 | Thompson ............ | H04L 63/029 713/168 |
| 2015/0295907 A1 * | 10/2015 | Abrahamson ......... | H04L 9/0656 380/46 |
| 2019/0044923 A1 * | 2/2019 | Thompson ............. | H04L 9/321 |
| 2020/0274697 A1 * | 8/2020 | Ragan ..................... | H04L 63/06 |
| 2020/0287710 A1 * | 9/2020 | Thompson ............. | G06F 7/588 |
| 2021/0058237 A1 * | 2/2021 | Sandberg ............... | G06F 21/72 |
| 2022/0141203 A1 * | 5/2022 | Thompson .......... | H04L 63/0435 713/164 |
| 2024/0005312 A1 * | 1/2024 | Kulkarni .............. | G06Q 20/385 |

* cited by examiner

*Primary Examiner* — Amare F Tabor

(57) ABSTRACT

A processing system implementing end-to-end encryption includes a number of nodes each connected to a network and including a respective processor. Further, at least one node connected to the network includes a one-time pad (OTP) pregeneration circuitry configured to select an OTP pregeneration operating mode based on the number of nodes connected to the network. Further, the pregeneration circuitry of the node is configured to generate an OTP associated with another node connected to the network based on the selected OTP pregeneration operating mode before a packet is received from that node.

20 Claims, 6 Drawing Sheets

PREGENERATION OF ONE-TIME PADS FOR END-TO-END ENCRYPTION

BACKGROUND

Within some processing systems, instructions for applications are executed by a number of nodes connected by a network configured to route packets between the nodes. To help improve bandwidth within the network, certain networks are configured to route packets from a source node to one or more intermediate nodes before being received by the destination node. However, routing the packets to intermediate nodes risks exposing data in the packets to malicious entities. To this end, some processing systems include end-to-end encryption that includes encrypting a packet at the source node and decrypting the packet at the destination node. For example, in some processing systems, a source node encrypts a packet using a one-time pad (OTP) before the packet is provided to the network and routed to a destination node. In response to receiving an encrypted packet, the destination node identifies the source node that sent the encrypted packet, generates the same OTP used to encrypt the packet, and uses the OTP to decrypt the packet. However, generating the OTP at the destination node after the encrypted packet has been received adds extra processing cycles on the critical path of the destination node. For example, extra processing cycles are added to retrieve data needed to generate an OTP and generate the OTP itself. Due to these added cycles, the processing times at the destination node increase and the efficiency of the processing system decreases.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
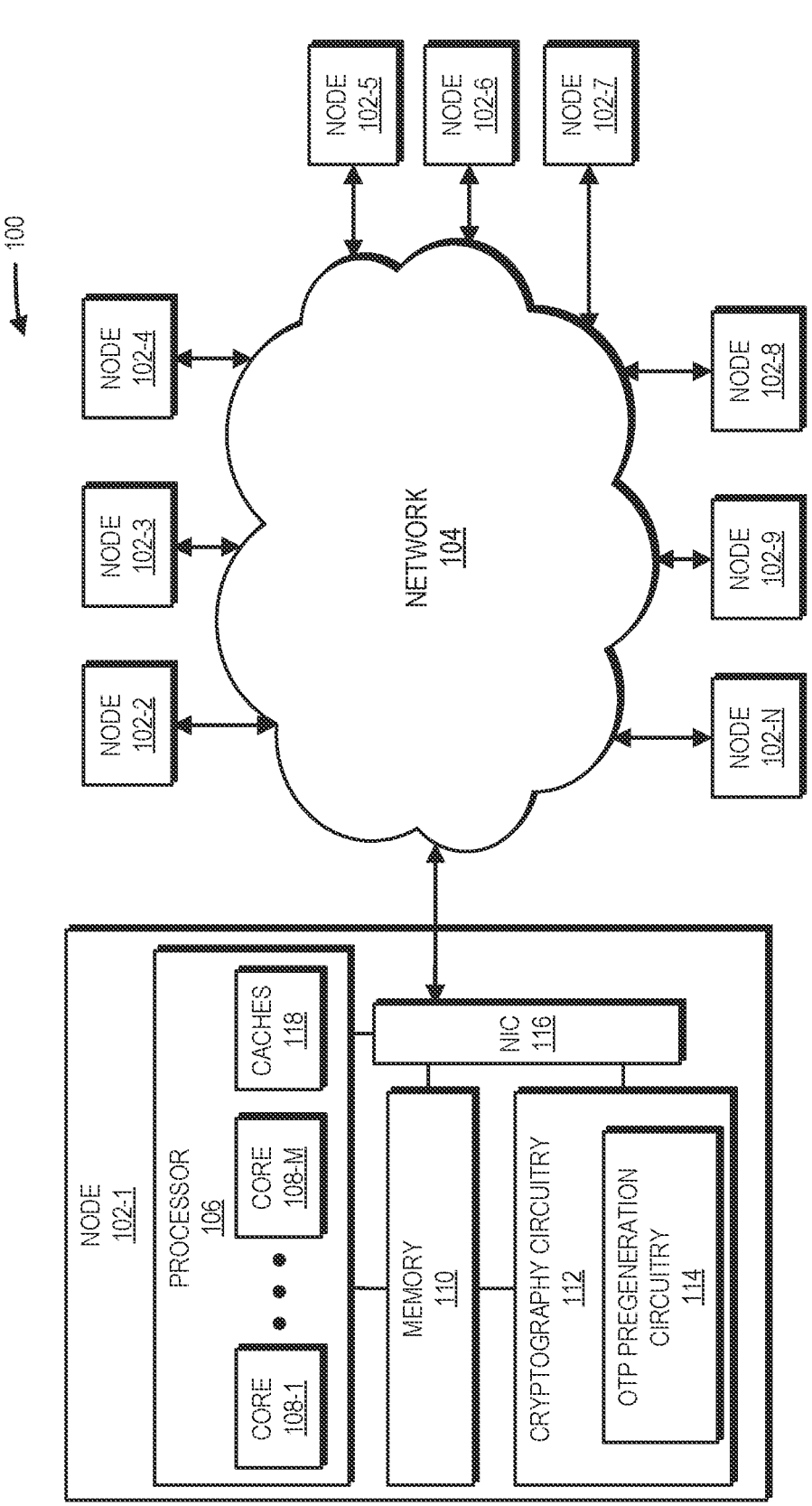
FIG. 1 is a block diagram of a processing system configured to pregenerate one-time pads (OTPs) for one or more nodes of a network, in accordance with some implementations.

Some processing systems include one or more nodes (e.g., memory nodes, compute nodes) communicatively coupled together via a network, for example, a shared data fabric network, local area network (LAN), wide area network (WAN), or the like. Each node of such processing systems includes, for example, one or more integrated circuits (ICs)

each including one or more processors (e.g., central processing units (CPUs), graphics processing units (GPUs)), programmable logic devices (e.g., one or more field-programmable gate arrays (FPGAs), one or more memories, or any combination thereof. To help facilitate the execution of one or more applications by a processing system, one or more nodes (e.g., compute nodes) of the processing system are configured to execute one or more instructions for the applications. To this end, one or more processors of a node (e.g., compute node) include one or more processor cores each configured to perform one or more operations for one or more instructions of an application. Further, one or more processor cores of a node are configured to store data such as operands, instructions, results (e.g., data resulting from the performance of one or more operations), or the like in a memory of one or more other nodes. That is to say, one or more processor cores of a first node (e.g., compute node) are configured to store data (e.g., operands, instructions, results) in a memory of a second node (e.g., memory node).

To store data in another node, a processor of a first node (e.g., source node) is configured to generate one or more packets indicating the data to be stored and provide the generated packets to the network connected to the nodes. Such packets, for example, include a header that indicates the node (e.g., source node) that generated the packet and a node (e.g., destination node) that includes a memory in which to store data. Further, the packets include a payload indicating the data to be stored. In response to receiving a packet, the network (e.g., a network switch of the network) is configured to route the packet from the first node (e.g., source node) to the second node (e.g., destination node) based on a routing policy (e.g., data indicating how packets are to be routed within the network). For example, based on a routing policy, a network is configured to route a packet received from a first node (e.g., source node) to a second node (e.g., destination node) via one or more intermediate hops to other nodes on the network. As an example, a network is configured to route a packet from a source node to an intermediate node and from the intermediate node to a destination node.

To help ensure the packets being routed within the network are secure, one or more processors of a source node are configured to encrypt data in the packet (e.g., the payload of the packet). For example, before providing a packet to a connected network, one or more processors of a source node are configured to generate a one-time pad (OTP) that includes, for example, data indicating a stream cipher to encrypt the packet. The OTP is configured to be single-use such that only one packet is encrypted by the one or more processors according to the OTP. After the packet is encrypted using the OTP, the packet is provided to the network which routes the packets to the destination node (e.g., via one or more intermediate nodes). In response to the destination node receiving the encrypted packet from the network, one or more processors of the destination node identify the source node indicated by the packet (e.g., indicated in the header of the packet) and determine an OTP to decrypt the packet (e.g., determine the OTP used to encrypt the packet). However, determining the OTP after the destination node receives the encrypted packets adds additional processing cycles at the destination node, increasing the processing time needed to decrypt and store data at the destination node. For example, one or more processors of a destination node require 20 ns or more to generate a 128-bit OTP for a received packet, increasing the processing time at the destination node.

To help reduce the time needed to decrypt and store data at the destination node, some processing systems include one or more destination nodes configured to predict and store one or more OTPs that are then used to decrypt one or more received packets. For example, within some processing systems, one or more cache lines are encrypted using one or more respective OTPs before being written to a memory of a first node (e.g., memory node). In response to a cache miss at a second node, one or more processors of the second node are configured to generate two requests-a first request requesting the cache line that caused the cache miss from the memory of the first node and a second request requesting a sequence number used by circuitry to encrypt the cache line that caused the cache miss. Additionally, the second node includes a prediction circuitry that is configured to assign a root sequence number to each virtual memory page associated with a cache line of the second node by a hardware random number generator each time a respective virtual page associated with a cache line is mapped to a physical one. For each missing cache line that causes a cache miss, the prediction circuitry uses the root sequence number associated with the virtual page of the cache line to generate one or more sequence number predictions each associated with a predetermined OTP. The prediction circuitry then stores the sequence number predictions in a request queue. After receiving the cache line from the first node, the prediction circuitry compares the sequence number predictions to the sequence number of the retrieved cacheline from the first node. If a match is found, then one or more processors of the second node decrypt the retrieved cache line using the corresponding predetermined OTP associated with the respective sequence number prediction. If no match can be found, one or more processors of the second node use the received sequence number of the cache line to determine an OTP and decrypt the retrieved cache line using the determined OTP. However, such prediction circuitry requires a large request queue to store all the sequence number predictions generated by the processors of the node. As such, when there are many nodes (e.g., memory nodes) within the processing system connected to the network, using such prediction circuitry to predetermine OTPs is impractical due to the size of the request queue that would be required to accommodate sequence number predictions for multiple nodes (e.g., memory nodes).

To this end, systems and techniques described herein are directed to predetermining OTPs based on the number of nodes connected to the network of a processing system. For example, within a processing system including two or more nodes (e.g., compute node, memory nodes) communicatively coupled via a network (e.g., shared data fabric network, LAN, WAN), one or more nodes include an OTP pregeneration circuitry configured to operate in either a cached operation mode or prediction operation mode based on the number of nodes connected to the network. For example, in implementations, the OTP pregeneration circuitry is configured to compare a ratio of a cache size (e.g., the size of one or more caches in the processing system) to a node count (e.g., the number of nodes connected to the network in the processing system) to a predetermined threshold value. In response to the ratio of cache size to node count being equal to or exceeding the predetermined threshold value (e.g., due to the number of nodes being low, the cache size being large, or both), OTP pregeneration circuitry is configured to operate in a cached operating mode. Within a cached operating mode, the OTP pregeneration circuitry is configured to generate one or more OTPs for each node connected to the network and stores the generated OTPs in one or more caches. After receiving an encrypted packet, the OTP pregeneration circuitry determines data (e.g., a source ID) identifying the source node that sent the packet (e.g., from the header of the received encrypted packet) and decrypts the packet using a cached OTP associated with the identified source node. As such, when there are one or more caches of a large size, a low number of nodes, or both within the processing system, the OTP pregeneration circuitry generates OTPs for each node, reducing the time needed to decrypt received encrypted packets.

If the ratio of the cache size to node count is less than the predetermined threshold value (e.g., due to the number of nodes being high, the cache size being small, or both), the OTP pregeneration circuitry operates in a prediction operation mode. Within a prediction operating mode, OTP pregeneration circuitry is configured to predict one or more nodes connected to the network from which an encrypted packet will be received. To this end, the OTP pregeneration circuitry first determines one or more features (e.g., virtual page numbers, program counters, cache line offsets, byte offsets, word offsets) associated with an application being executed by the processing system. Based on these features, the OTP pregeneration circuitry identifies one or more nodes connected to the network predicted to send an encrypted packet to the node including the OTP pregeneration circuitry. The OTP pregeneration circuitry then generates one or more OTPs associated with the identified nodes predicted to send an encrypted packet and stores the generated OTPs and data identifying the nodes predicted to send an encrypted packet in a cache. In response to receiving an encrypted packet, the OTP pregeneration circuitry compares data identifying the node that sent the encrypted packet (e.g., as indicated in a header of the packet) to the data identifying the nodes in the cache. If the data identifying the node that sent the encrypted packet matches data identifying a node stored in the cache, the OTP pregeneration circuitry uses the OTP associated with the identified node to decrypt the packet. If the data identifying the node that sent the encrypted packet does not match any of the data identifying the nodes in the cache, the OTP pregeneration circuitry generates an OTP based on the data identifying the node that sent the encrypted packet and uses the generated OTP to decrypt the packet. In this way, the OTP pregeneration circuitry only generates OTPs for nodes predicted to send an encrypted packet, reducing the number of OTPs that need to be cached and lowering the time needed to decrypt received packets when there is a match to the cached data.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions, or some combination thereof.

FIG. 1 illustrates a processing system 100 configured to pregenerate OTPs for one or more nodes of a network, in accordance with some implementations. In implementations, processing system 100 includes a computing environment configured to execute one or more applications such as a data center, one or more servers, or the like. To this end, processing system 100 includes two or more nodes 102 each communicatively coupled to one another via network 104. Network 104, for example, includes a shared data fabric network, LAN, WAN, or any combination thereof configured to communicatively couple a first node 102 to one or more other nodes 102 of processing system 100. Though the example implementation presented in FIG. 1 shows 10 nodes (102-1, 102-2, 102-3, 102-4, 102-5, 102-6, 102-7, 102-8, 102-9, 102-N) representing an N number of nodes 102 connected to network 104, in other implementations, any number of nodes 102 may be connected to network 104. To support the execution of applications by processing system 100, one or more nodes 102 each include or have access to a respective memory 110 or other storage component implemented using a non-transitory computer-readable medium, for example, a dynamic random-access memory (DRAM). However, in implementations, one or more memories 110 of one or more nodes 102 are implemented using other types of memory including, for example, static random-access memory (SRAM), double data rate SDRAM (DDR SRAM), nonvolatile RAM, and the like.

According to implementations, one or more memories 110 of one or more nodes 102 include program code for one or more applications executed by processing system 100. Such program code, for example, includes data indicating one or more workloads, instructions, operations, or any combination thereof to be performed for one or more applications. To perform these workloads, instructions, and operations, one or more nodes 102 each include one or more processors 106, programmable logic devices (e.g., FPGAs), or both. Such processors 106, for example, each include any of a variety of parallel processors, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. In some implementations, to execute workloads and instructions for one or more applications, one or more processors 106 of one or more nodes 102 each include one or more processor cores 108 to perform one or more operations for one or more workloads, instructions, or both. For example, one or more processor cores 108 of a processor 106 are each configured to operate as a compute unit. These compute units each include one or more single instruction, multiple data (SIMD) units that perform the same operation on different data sets to produce one or more results. Such results, for example, include data resulting from the performance of one or more operations by one or more processor cores 108. After producing one or more results, a compute unit is then configured to store the results in one or more caches 118 within or otherwise coupled to the compute unit (e.g., the processor core 108 operating as a compute unit), memory 110 within the same node 102 as the compute unit, or both. Though the example implementation presented in FIG. 1 presents a processor 106 as having two processor cores (108-1, 108-M) representing an M number of processor cores, in other implementations, a processor 106 may have any number of processor cores 108.

According to implementations, one or more processors 106 (e.g., one or more processor cores 108) of a node 102 are configured to store data (e.g., operands, instructions, results) in a memory 110 of one or more other nodes 102. For example, one or more processors 106 of a first node 102-1 are configured to store a result (e.g., data resulting from the performance of one or more operations) in a memory 110 of a second node 102-6. To this end, one or more processors 106 of a node 102 are configured to generate one or more packets indicating data to be written to a memory 110 of another node 102. These packets, for example, include a header that includes data indicating the node 102 (e.g., source node) that generated the packet and the node 102 (e.g., destination node) that includes the memory 110 to which data is to be written and include a payload that includes the data to be written to the memory 110 of the destination node 102. As an example, a packet includes a header with data (e.g., a source identifier (source ID)) identifying the source node 102 that generated and identifying a destination node 102 and a payload indicating data to be written to a memory 110 of the destination node. In response to generating a packet, one or more processors 106 of a node provide the packet to a network interface controller (NIC) 116 that includes circuitry configured to communicatively couple the processors 106 of the node 102 to network 104. The NIC 116 of the node 102 then provides the packet to network 104.

According to implementations, network 104 is configured to route the packet from a first node 102 (e.g., source node) to a second node 102 (e.g., a destination node indicated by the packet) based on one or more routing policies. Such routing policies, for example, each include data indicating how packets are to be routed within network 104. As an example, network 104 includes one or more switches (not shown for clarity) each configured to route a packet from a first node 102 (e.g., source node) to a second node (e.g., destination node) based on one or more routing policies. In implementations, based on a routing policy, network 104 is configured to route a packet received from a first node 102 (e.g., a source node) to a second node 102 (e.g., a destination node) via one or more intermediate hops to other nodes 102 connected to network 104. As an example, network 104 is configured to route a packet from a first node 102-1 (e.g., source node) to a second node 102-3 (e.g., intermediate node) and from the second node 102-3 to a third node 102-7 (e.g., destination node).

To help ensure that the packets are secure as they are routed within network 104, one or more nodes 102 each include cryptography circuitry 112 configured to encrypt and decrypt at least a portion of a packet (e.g., the payload of a packet). For example, cryptography circuitry 112 of a node 102 is configured to encrypt a packet before the packet is provided to a NIC 116 of the node 102. According to implementations, the cryptography circuitry 112 of one or more nodes 102 is configured to encrypt at least a portion of a packet using an OTP. An OTP, for example, includes a random cryptographic key (e.g., random stream cipher), pseudo-random cryptographic key, or both used to encrypt a payload of a packet. Such OTPs are configured to be single-use such that only one packet is encrypted using an OTP by a cryptography circuitry 112. In implementations, a cryptography circuitry 112 of a node 102 generates an OTP based on a secret key that is unique to the node and another node (e.g., destination node) on network 104 and based on a counter value (e.g., configured to increase each time an OTP is generated). Once a packet is encrypted using an OTP, the cryptography circuitry 112 of a node 102 provides the encoded packet to network 104 via a NIC 116 of the node 102.

After a packet is encrypted using an OTP and provided to network 104, network 104 forwards the encrypted packet to a destination node 102 (e.g., a destination node indicated in the header of the packet). According to some implementations, in response to receiving an encrypted packet, the cryptography circuitry 112 of a node 102 (e.g., destination node) is configured to determine data indicating the source node (e.g., the node 102 that send the encrypted packet) based on, for example, the header of the packet. As an example, based on a received encrypted packet, cryptography circuitry 112 is configured to determine a source ID of the node 102 that sent the encrypted packet. After determining the data indicating the source node (e.g., source ID) that sent the encrypted packet, the cryptography circuitry 112 of the node 102 is configured to determine an OTP to decrypt the packet (e.g., the OTP used to encrypt the packet) based on the determined data (e.g., source ID). As an example, based on a source ID determined from a received encrypted packet, a cryptography circuitry 112 of a node 102 (e.g., destination node) retrieves a counter value associated with the node 102 indicated by the source ID from a cache 118, memory 110, or both of one or more nodes 102. Using the counter value and the secret key associated with the node 102 (e.g., destination node) and the node 102 indicated by the source ID (e.g., source node), the cryptography circuitry 112 determines the OTP used to encrypt the received packet and decrypts the packet using the OTP. As an example, the cryptography circuitry 112 performs a XOR operation on the data in the payload of the packet and the determined OTP to decrypt the packet. After the packet is decrypted using the OTP, one or more processors 106 of the node 102 (e.g., destination node) store data indicated in the payload of the packet in a memory 110 of the node 102. However, having the cryptography circuitry 112 of a destination node determine an OTP for an encrypted packet after the packet has been received adds additional processing cycles at the destination node, increasing the processing time needed to decrypt and store data at the destination node.

To this end, according to implementations, one or more nodes 102 of processing system 100 include a respective OTP pregeneration circuitry 114. An OTP pregeneration circuitry 114, for example, is configured to generate and store one or more OTPs before an encrypted packet is received by the node 102 that includes the OTP pregeneration circuitry. For example, an OTP pregeneration circuitry 114 is configured to store one or more pregenerated OTPs (e.g., OTPs generate before an encrypted packet is received) in a cache 118 of the node 102. In implementations, OTP pregeneration circuitry 114 is configured to operate in a first operating mode (e.g., cached mode) or a second mode (e.g., prediction mode) based on the number of nodes 102 connected to network 104. To this end, the OTP pregeneration circuitry 114 is configured to determine a ratio of the size of the cache 118 used to store the predetermined OTPs to the number of nodes 102 connected to network 104 (e.g., cache size/number of nodes). The OTP pregeneration circuitry 114 is then configured to compare the determined ratio (e.g., cache size/number of nodes) to a predetermined threshold value. In response to the determined ratio being equal to or exceeding the predetermined threshold (e.g., due to a large size of the cache 118 used to store the predetermined OTPs, a low number of nodes 102 connected to network 104, or both), the OTP pregeneration circuitry 114 operates in a cached operating mode. In response to the determined ratio being less than the predetermined threshold (e.g., due to a small size of the cache 118 used to store the predetermined OTPs, a high number of nodes 102 connected to network 104, or both), the OTP pregeneration circuitry 114 operates in a prediction operation mode.

When operating in a cached operation mode, an OTP pregeneration circuitry 114 of a node 102 is configured to determine one or more OTPs for each node 102 connected to network 104. For example, an OTP pregeneration circuitry 114 of a node 102 is configured to retrieve a respective counter value for each other node 102 connected to network 104 from a cache 118, memory 110, or both of one or more nodes 102 (e.g., a cache 118, memory 110 or both of the node 102 including the OTP pregeneration circuitry 114, one or more other nodes 102 connected to network 104, or both). The OTP pregeneration circuitry 114 of a node 102 then generates an OTP for each other node 102 connected to network 104 based on a respective secret key associated with the node 102 including the OTP pregeneration circuitry 114 and one other node 102 connected to network 104 and based on the respective counter value of the one other node 102 connected to network 104. After determining the OTPs for each other node 102 connected to network 104, the OTP pregeneration circuitry 114 of a node 102 stores the generated OTPs in a cache 118 of the node. In response to receiving an encrypted packet, the OTP pregeneration circuitry 114 of a node 102 determines data indicating the source node (e.g., source ID) that sent the encrypted packet and retrieves an OTP associated with that source node from the cache 118. The OTP generation circuitry of the node 102 then decrypts the received packet by, for example, performing a XOR operation on the received packet (e.g., a payload of the packet) and the retrieved OTP. In this way, when there are one or more caches 118 of a large size to store pregenerated OTPs, a low number of nodes 102 connected to network 104, or both, the OTP pregeneration circuitry 114 of a node pregenerates OTPs for each node 102 before an encrypted packet is received, reducing the time needed to decrypt received encrypted packets. That is to say, because the OTP for an encrypted packet is generated before an encrypted packet is received rather than after, the time needed to decrypt the encrypted packet and store the data indicated in the packet in a memory 110 of a destination node is reduced.

When operating in a prediction operating mode, the OTP pregeneration circuitry 114 of a node 102 is configured to generate OTPs for one or more other nodes 102 connected to network 104 predicted to send an encrypted packet to the node 102 including OTP pregeneration circuitry 114. To this end, the OTP pregeneration circuitry 114 of a node 102 first determines one or more features (e.g., virtual page numbers, program counters, cache line offsets, byte offsets, word offsets) associated with an application being executed by processing system 100. For each determined feature, the OTP pregeneration circuitry 114 then computes an embedding based on one or more lookup tables (LUTs) mapping one or more application features (e.g., virtual page numbers, program counters, cache line offsets, byte offsets, word offsets) to one or more values. Such embeddings, for example, each include data representing a fixed-length vector having a predetermined size. Additionally, the OTP pregeneration circuitry 114 applies weights to each embedding based on, for example, a sequence of tokens stored in a memory 110 of the node 102 or one or more other nodes 102 connected to network 104. The OTP pregeneration circuitry 114 then provides the weighted embeddings to one or more machine-learning models, neural networks, or both to determine data representing one or more source IDs each identifying a node 102 connected to network 104. For example, the OTP pregeneration circuitry 114 provides the weighted embeddings to a long short-term memory neural network configured to receive one or more weighted embeddings and output data representing one or more source IDs. Based on the data representing one or more source IDs, the OTP pregeneration circuitry 114 generates a probability distribution that includes source IDs for one or more nodes 102 connected to network 104 and data indicating respective probabilities that those nodes 102 will send an encrypted packet to the node 102 including the OTP pregeneration circuitry. From the probability distribution, the OTP pregeneration circuitry 114 identifies one or more nodes 102 connected to network 104 likely to send an encrypted packet to the node 102 including the OTP pregeneration circuitry 114. For example, the OTP pregeneration circuitry 114 compares the probability associated with each source ID indicated in the probability distribution to a predetermined probability threshold value. In response to the probability being equal to or exceeding the predetermined probability threshold value, the OTP pregeneration circuitry 114 identifies the node 102 associated with the probability as being likely to send an encrypted packet to the node 102 including the OTP pregeneration circuitry 114.

For each node 102 connected to network 104 identified as likely to send an encrypted packet to the node 102 including the OTP pregeneration circuitry 114, the OTP pregeneration circuitry 114 requests a counter value associated with that node 102 from a cache 118, memory 110, or both of the node including the OTP pregeneration circuitry 114, one or more other nodes connected to network 104, or both. Using the counter values associated with the nodes 102 identified as likely to send an encrypted packet and secret keys associated with the nodes 102 identified as likely to send an encrypted packet and the node 102 including the OTP pregeneration circuitry 114, the OTP pregeneration circuitry 114 generates an OTP for each node 102 identified as likely to send an encrypted packet and stores such OTPs in a cache 118. In response to receiving an encrypted packet, the OTP pregeneration circuitry 114 compares data identifying the node that sent the encrypted packet (e.g., as indicated in a header of the packet) to the data identifying the nodes 102 identified as likely to send an encrypted packet in the cache 118. If the data identifying the node 102 that sent the encrypted packet matches data identifying a node 102 identified as likely to send an encrypted packet stored in the cache 118, the OTP pregeneration circuitry 114 uses the OTP associated with the identified node 102 to decrypt the packet. For example, the OTP pregeneration circuitry 114 performs a XOR operation on the OTP and payload of the packet to decrypt the received packet. If the data identifying the node 102 that sent the encrypted packet does not match any of the data identifying the nodes 102 identified as likely to send an encrypted packet in the cache 118, the OTP pregeneration circuitry 114 requests a counter value associated with the identified node 102 and generates an OTP based on the counter value and a secret key associated with the identified node 102. In this way, the OTP pregeneration circuitry 114 only generates OTPs for nodes predicted to send an encrypted packet, reducing the number of OTPs that need to be cached and lowering the time needed to decrypt received packets when there is a match to the cached data.

Figure 2:
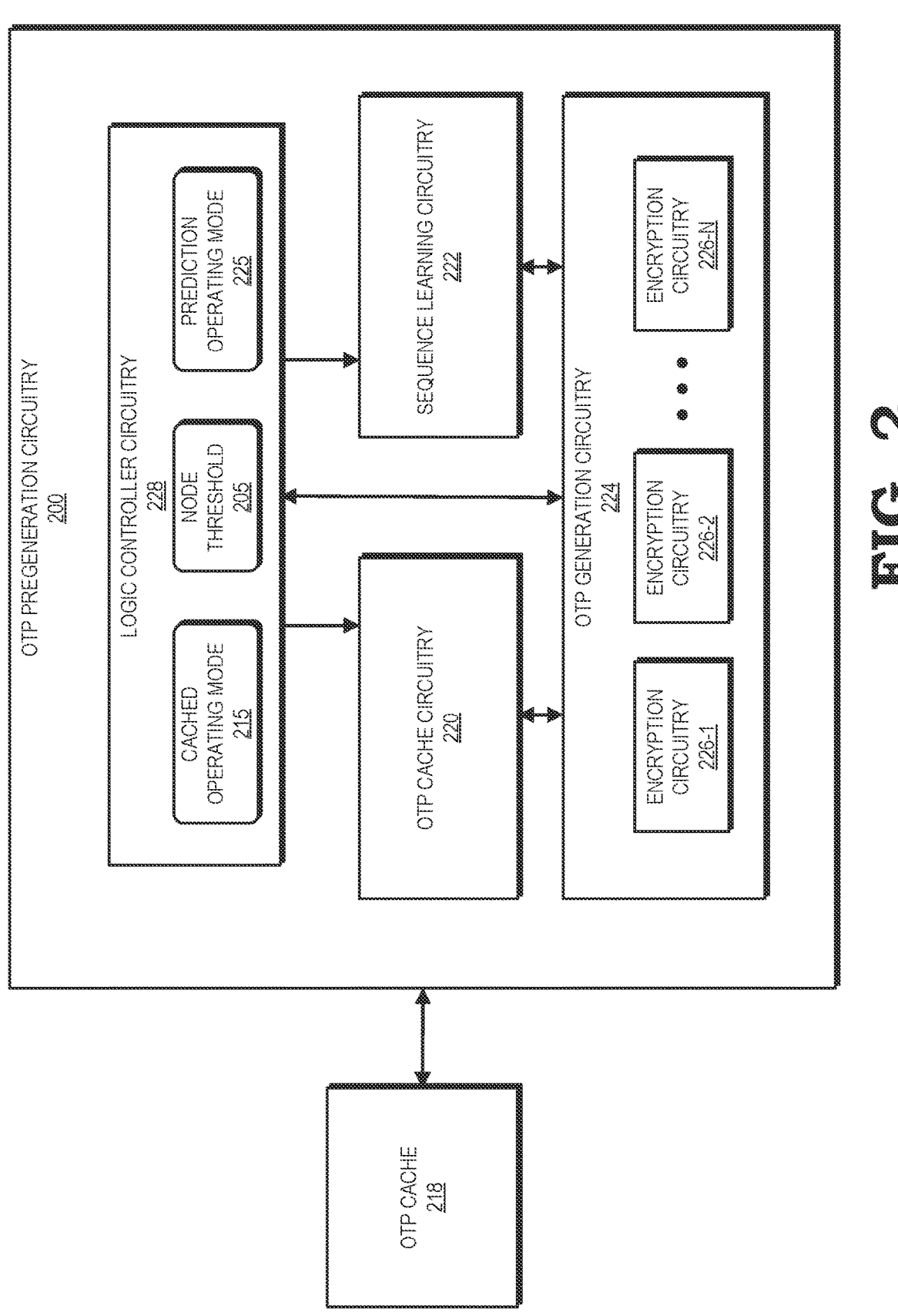
FIG. 2 is a block diagram of an example OTP pregeneration circuitry of a node, in accordance with some implementations.

Referring now to FIG. 2, an example OTP pregeneration circuitry 200 is presented, in accordance with some implementations. In implementations, OTP pregeneration circuitry, similar to or the same as OTP pregeneration circuitry 114, is included in one or more nodes 102 connected to network 104 of processing system 100 and is configured to pregenerate one or more OTPs for one or more nodes 102 connected to network 104. To this end, OTP pregeneration circuitry 200 includes logic controller circuitry 228, OTP cache circuitry 220, sequence learning circuitry 222, OTP generation circuitry 224, or any combination thereof. Further, OTP pregeneration circuitry 200 is configured to store one or more pregenerated OTPs (e.g., OTPs generated before an encrypted packet is received) for one or more nodes 102 connected to network 104 in OTP cache 218, similar to or the same as a caches 118. OTP cache 218, for example, is included in or otherwise connected to one or more processors 106 of a node 102 including OTP pregeneration circuitry 200. For example, in some embodiments, one or more portions of one or more caches 118 form at least a portion of OTP cache 218. As another example, at least a portion of OTP cache 218 is formed from a one or more caches separate from caches 118.

Logic controller circuitry 228 is configured to select an operating mode for OTP pregeneration circuitry 200 (e.g., select an OTP pregeneration operating mode). For example, logic controller circuitry 228 is configured to select between a first OTP pregeneration operating mode (e.g., cached operating mode 215) and a second OTP pregeneration operating mode (e.g., prediction operating mode 225) for OTP pregeneration circuitry 200. In implementations, logic controller circuitry 228 is configured to select an OTP pregeneration operating mode from two or more OTP pregeneration operating modes (e.g., cached operating mode 215, prediction operating mode 225). To determine an operating mode (e.g., OTP pregeneration operating mode), logic controller circuitry is first configured to determine a number of nodes 102 connected to network 104. For example, logic controller circuitry 228 is configured to determine a number of nodes 102 connected to network 104 by sending a query to network 104 (e.g., to a router, switch, or the like of network 104). After determining the number of nodes 102 connected to a network, logic controller circuitry 228 determines a ratio of the size of OTP cache 218 to the number of nodes connected to network 104 (e.g., cache size/number of nodes) and compares the ratio to node threshold 205. For example, logic controller circuitry 228 determines a ratio of the size of one or more portions of caches 118 forming OTP cache 218 to the number of nodes connected to network 104 and compares the ratio to node threshold 205. As another example, logic controller circuitry 228 determines a ratio of the size of one or more caches separate from caches 118 forming OTP cache 218 to the number of nodes connected to network 104 and compares the ratio to node threshold 205. Node threshold 205, for example, includes data representing a predetermined value. Based on the comparison of the ratio (e.g., cache size/number of nodes) to node threshold 205, logic controller circuitry 228 selects between a cached operating mode and a prediction operating mode for OTP pregeneration circuitry 200 (e.g., determines a selected OTP pregeneration operating mode). For example, in response to the ratio of the size of OTP cache 218 to the number of nodes connected to network 104 being equal to or exceeding node threshold 205 (e.g., based on the size of OTP cache 218 being large, a small number of nodes 102 connected to network 104, or both), logic controller circuitry 228 selects a cached operating mode 215 for OTP pregeneration circuitry 200. In response to the ratio of the size of OTP cache 218 to the number of nodes connected to network 104 being less than node threshold 205 (e.g., based on the size of OTP cache 218 being small, a large number of nodes 102 connected to network 104, or both), logic controller circuitry 228 selects a prediction operating mode 225 for OTP pregeneration circuitry 200.

To operate in a cached operating mode 215, OTP pregeneration circuitry 200 includes OTP cache circuitry 220. OTP cache circuitry 220 is configured to generate an OTP for each other node 102 connected to network 104 (e.g., each node 102 other than the node 102 including OTP pregeneration circuitry 200). For example, OTP cache circuitry 220 is configured to retrieve a counter value associated with each other node 102 connected to network 104 (e.g., each node 102 other than the node 102 including OTP pregeneration circuitry 200) from a memory 110, cache 118, or both of the node 102 including OTP pregeneration circuitry 200, one or more other nodes 102 connected to network 104, or both. OTP cache circuitry 220 then determines a respective OTP for each other node 102 connected to network 104 based on the counter value associated with a node 102 connected to network 104 and a secret key shared between the node 102 and the node 102 including OTP pregeneration circuitry 200. To this end, OTP pregeneration circuitry 200 includes OTP generation circuitry 224 configured to generate one or more OTPs. For example, OTP pregeneration circuitry 200 includes one or more instances of encryption circuitry 226 configured to generate OTPs based on respective counter values and respective secret keys shared between the node 102 including OTP pregeneration circuitry 200 and other nodes 102 connected to network 104. After OTP cache circuitry 220 uses one or more instances of encryption circuitry 226 to generate OTPs for each other node 102 connected to network 104 (e.g., each node 102 other than the node 102 including OTP pregeneration circuitry 200), OTP cache circuitry 220 stores the generated OTPs in OTP cache 218.

According to implementations, each instance of encryption circuitry 226 is further configured to encrypt, decrypt, or both data in one or more packets. For example, an instance of encryption circuitry 226 (e.g., an instance of Advance Encryption Standard (AES) circuitry) is configured to decrypt a packet by performing a XOR operation on data in the payload of a packet and an OTP. In implementations, one or more instances of encryption circuitry 226 are associated with OTP cache circuitry 220 such that OTP cache circuitry 220 uses the instances of encryption circuitry 226 associated with OTP cache circuitry 220 to pregenerate OTPs. Similarly, one or more instances of encryption circuitry 226 are associated with sequence learning circuitry 222 such that sequence learning circuitry 222 uses the instances of encryption circuitry 226 associated with sequence learning circuitry 222 to pregenerate OTPs. According to implementations, the instances of encryption circuitry 226 assigned to sequence learning circuitry 222 are different from the instances assigned to OTP cache circuitry 220. Though the example implementation presents OTP generation circuitry 224 as including three instances of encryption circuitry (226-1, 226-2, 226-N) representing an N number of instances of encryption circuitry, in other implementations, OTP generation circuitry 224 can include any number of instances of encryption circuitry 226.

To operate in a prediction operating mode 225, OTP pregeneration circuitry 200 includes sequence learning circuitry 222. Sequence learning circuitry 222 is configured to generate OTPs for each node 102 connected to network 104 predicted to send an encrypted packet to the node 102 including OTP pregeneration circuitry 200. To this end, logic controller circuitry 228 is configured to determine one or more application features of one or more applications being executed by processing system 100. Such application features, for example, include virtual page numbers, program counters, cache line offsets, byte offsets, word offsets, or any combination thereof. For example, logic controller circuitry 228 is configured to retrieve a profile for an application that includes data indicating one or more application features from a memory 110 of the node 102 including OTP pregeneration circuitry 200, one or more other nodes connected to network 104, or both. After determining one or more application features for one or more applications, logic controller circuitry 228 provides the application features to sequence learning circuitry 222. Sequence learning circuitry 222 is then configured to generate one or more embeddings (e.g., fixed-length vectors having a predetermined length) based on the application features and apply one or more weights to the embeddings based on a stream of tokens associated with one or more applications (e.g., a stream of tokens associated with one or more applications executed by processing system 100). Sequence learning circuitry 222 then provides the weighted embeddings to one or more trained machine-learning models, neural networks (e.g., long short-term memory), or both configured to generate data (e.g., predicted embeddings) representing one or more nodes 102 connected to network 104. Based on the data (e.g., predicted embeddings) representing one or more nodes 102 connected to network 104, sequence learning circuitry 222 generates a probability distribution that includes probabilities each associated with respective data representing a node 102 connected to network 104 (e.g., a respective source ID of a node 102 connected to network 104). From the probability distribution, sequence learning circuitry 222 identifies one or more nodes 102 connected to network 104 likely to send an encrypted packet to the node 102 including OTP pregeneration circuitry 200. As an example, in response to a probability associated with a source ID (e.g., data representing a node 102) being equal to or above a predetermined threshold value, sequence learning circuitry 222 identifies the node 102 indicated by the source ID as likely to send an encrypted packet to the node 102 including OTP pregeneration circuitry 200.

For each node 102 identified as likely to send an encrypted packet to the node 102 including OTP pregeneration circuitry 200, sequence learning circuitry 222 retrieves a counter value associated with the node 102 from a cache 118, memory 110, or both of the node 102 including OTP pregeneration circuitry 200, one or more other nodes 102 connected to network 104, or both. Further, for each node 102 identified as likely to send an encrypted packet to the node 102 including OTP pregeneration circuitry 200, sequence learning circuitry 222 generates an OTP based on the counter value associated with the node 102 and a secret key shared between the node 102 and the node 102 including OTP pregeneration circuitry 200. For example, sequence learning circuitry 222 uses one or more instances of encryption circuitry 226 (e.g., instances of AES circuitry) associated with sequence learning circuitry 222 to generate the OTPs for each node 102 identified as likely to send an encrypted packet to the node 102 including OTP pregeneration circuitry 200. After sequence learning circuitry 222 generates an OTP for each node 102 identified as likely to send an encrypted packet to the node 102 including OTP pregeneration circuitry 200, sequence learning circuitry 222 stores the generated OTPs in OTP cache 218. In this way, sequence learning circuitry 222 only stores OTPs for nodes 102 identified as likely to send encrypted packets, reducing the number of pregenerated OTPs that need to be stored and reducing the size required for OTP cache 218 to store such OTPs.

Figure 3:
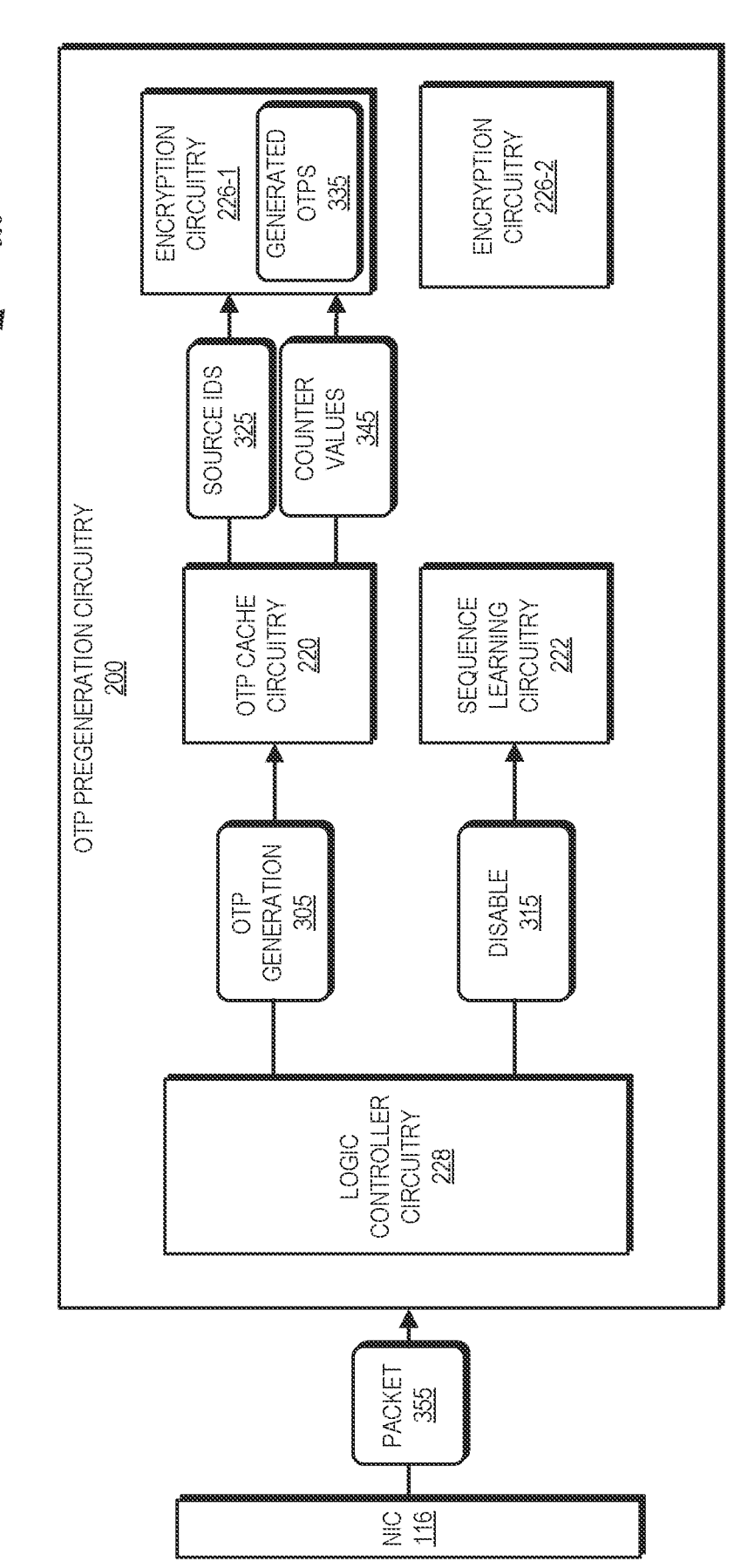
FIG. 3 is a flow diagram of an example operation for pregenerating OTPs in a cached operation mode, in accordance with some implementations.

Referring now to FIG. 3, an example operation 300 for pregenerating OTPs in a cached operation mode is presented, in accordance with some implementations. According to implementations, the example operation 300 first includes logic controller circuitry 228 sending an OTP generation command 305 to OTP cache circuitry 220. An OTP generation command 305 includes, for example, data instructing OTP cache circuitry 220 to generate OTPs for each other node 102 connected to network 104 (e.g., each node 102 other than the node 102 including OTP pregeneration circuitry 200). Further, example operation 300 includes logic controller circuitry 228 providing a disable command 315 to sequence learning circuitry 222. Such a disable command 315 includes, for example, data instructing sequence learning circuitry 222 to be idle. In response to receiving OTP generation command 305, OTP cache circuitry 220 is configured to determine data identifying each other node 102 connected to network 104 such as source IDs 325. For example, OTP cache circuitry 220 is configured to determine source IDs 325 for each other node 102 connected to network 104 based on one or more tables including address information associated with the network. Further, OTP cache circuitry 220 is configured to retrieve respective counter values 345 for each other node 102 connected to network 104 from a cache 118, memory 110, or both of the node 102 including OTP pregeneration circuitry 200, one or more other nodes 102 connected to network 104, or both. OTP cache circuitry 220 then provides source IDs 325 and counter values 345 to one or more instances of encryption circuitry 226 (e.g., instances of AES circuitry) associated with OTP cache circuitry 220. Referring to the example implementation presented in FIG. 3, OTP cache circuitry 220 provides source IDs 325 and counter values 345 to encryption circuitry 226-1. In response to receiving source IDs 325 and counter values 345, one or more instances of encryption circuitry 226 generated an OTP for each node 102 represented by source IDs 325 (e.g., generated OTPs 335). For example, one or more instances of encryption circuitry 226 generate an OTP for a node 102 based on a counter value 345 associated with the node 102 and a secret key shared between the node 102 and the node 102 including OTP pregeneration circuitry 200.

After producing generated OTPs 335, one or more instances of encryption circuitry 226 store the generated OTPs 335 in OTP cache 218 and use the generated OTPs 335 to decrypt packets received by the node 102 that includes OTP pregeneration circuitry 200. For example, in implementations, the node 102 including OTP pregeneration circuitry 200 receives an encrypted packet 355 at the NIC 116 of the node 102 from network 104. The NIC 116 then provides the encrypted packet 355 to cryptography circuitry 112, OTP pregeneration circuitry 114, or both. In response to cryptography circuitry 112, OTP pregeneration circuitry 114, or both receiving encrypted packet 355, one or more instances of encryption circuitry 226 are configured to decrypt the encrypted packet 355. For example, based on the encrypted packet 355 (e.g., a header of encrypted packet 355), an instance of encryption circuitry 226 is configured to determine a source ID of the node 102 that sent the encrypted packet 355. The instance of encryption circuitry 226 then retrieves the generated OTP 335 associated with the identified source ID from OTP cache 218 and decrypts the encrypted packet 355 using the retrieved OTP. As an example, the instance of encryption circuitry 226 performs a XOR operation on at least a portion of the encrypted packet 355 (e.g., a payload of the encrypted packet 355) and the retrieved OTP. According to implementations, OTP pregeneration circuitry 200 is configured to use one or more instances of encryption circuitry 226 associated with sequence learning circuitry 222 to decrypt a received encrypted packet 355. For example, in response to each instance of encryption circuitry 226 currently generating OTPs for OTP cache circuitry 220, one or more instances of encryption circuitry 226 associated with sequence learning circuitry 222 are used to decrypt a received encrypted packet 355. In this way, OTP pregeneration circuitry 200 has instances of encryption circuitry 226 ready to decrypt received encrypted packets 355 concurrently with instances of encryption circuitry 226 pregenerating OTPs, reducing the time needed to decrypt the encrypted packets 355.

Figure 4:
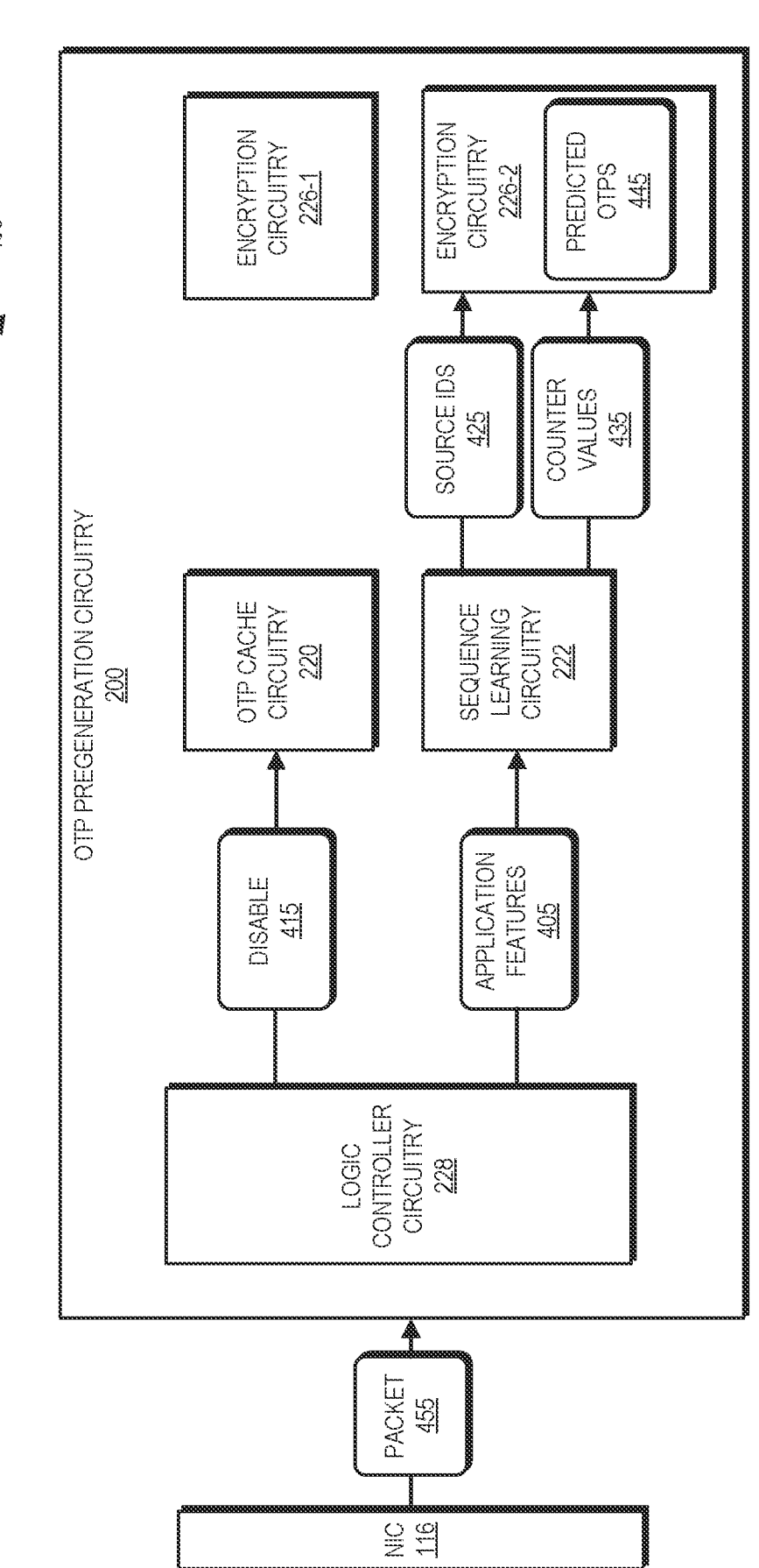
FIG. 4. is a flow diagram of an example operation for pregenerating OTPs in a prediction operation mode, in accordance with some implementations.

Referring now to FIG. 4, an example operation 400 for pregenerating OTPs in a prediction operation mode is presented, in accordance with some implementations. According to implementations, example operation 400 includes logic controller circuitry 228 sending one or more application features 405 to sequence learning circuitry 222. Such application features 405 include one or more features associated with one or more applications being executed by processing system 100, for example, virtual page numbers, program counters, cache line offsets, byte offsets, word offsets, and the like. Further, example operation 400 includes logic controller circuitry 228 providing a disable command 415 to OTP cache circuitry 220. Such a disable command 415 includes, for example, data instructing OTP cache circuitry 220 to be idle. In response to receiving application features 405, sequence learning circuitry 222 is configured to identify one or more nodes 102 connected to network 104 likely to send an encrypted packet to the node 102 including OTP pregeneration circuitry 200 based on application features 405. For example, sequence learning circuitry 222 is configured to first generate one or more embeddings (e.g., fixed-length vectors having a predetermined length) based on the received application features 405. Sequence learning circuitry 222 then applies one or more weights to the embeddings (e.g., based on a stream of tokens associated with one or more applications executed by processing system 100) and provides the weighted embeddings to one or more trained machine-learning models, neural networks (e.g., long short-term memory), or both configured to generate predicted embeddings representing one or more nodes 102 connected to network 104. Based on the predicted embeddings, sequence learning circuitry 222 generates a probability distribution that includes probabilities each associated with a respective source ID 425 that represents a node 102 connected to network 104. Using the probability distribution, sequence learning circuitry 222 identifies the source IDs 425 of the nodes 102 connected to network 104 likely to send an encrypted packet to the node 102 including OTP pregeneration circuitry 200. As an example, in response to a probability associated with a source ID 425 being equal to or above a predetermined threshold value, sequence learning circuitry 222 identifies the node 102 indicated by the source ID 425 as likely to send an encrypted packet to the node 102 including OTP pregeneration circuitry 200.

For each node 102 identified as likely to send an encrypted packet to the node 102 including OTP pregeneration circuitry 200, sequence learning circuitry 222 provides the source ID 425 of the node 102 to one or more instances of encryption circuitry 226 (e.g., one or more instances of AES circuitry). Additionally, in implementations, for each node 102 identified as likely to send an encrypted packet to the node 102 including OTP pregeneration circuitry 200, sequence learning circuitry 222 retrieves a counter value 435 associated with the node 102 from a cache 118, memory 110, or both of the node 102 including OTP pregeneration circuitry 200, one or more other nodes 102 connected to network 104, or both. After retrieving the counter values 435 for each node 102 identified as likely to send an encrypted packet to the node 102 including OTP pregeneration circuitry 200, sequence learning circuitry 222 provides the counter values 435 to one or more instances of encryption circuitry 226. Referring to the example implementation presented in FIG. 4, sequence learning circuitry 222 provides source IDs 425 and counter values 435 to encryption circuitry 226-2. In response to receiving source IDs 425 and counter values 435, one or more instances of encryption circuitry 226 generate an OTP for each node 102 represented by source IDs 425 (e.g., predicted OTPs 445). For example, one or more instances of encryption circuitry 226 generate an OTP for a node 102 based on a counter value 435 associated with the node 102 and a secret key shared between the node 102 and the node 102 including OTP pregeneration circuitry 200.

After producing predicted OTPs 445, one or more instances of encryption circuitry 226 store the predicted OTPs 445 in OTP cache 218 and use the predicted OTPs 445 to decrypt packets received by the node 102 that includes OTP pregeneration circuitry 200. For example, in implementations, the node 102 including OTP pregeneration circuitry 200 receives an encrypted packet 455 at the NIC 116 of the node 102 from network 104. The NIC 116 then provides the encrypted packet 455 to cryptography circuitry 112, OTP pregeneration circuitry 114, or both. In response to cryptography circuitry 112, OTP pregeneration circuitry 114, or both receiving encrypted packet 455, OTP pregeneration circuitry 200 is configured to determine if the source ID indicated by the received encrypted packet 455 (e.g., indicated by the header of encrypted packet 455) matches a source ID 425 of a predicted OTP 445 stored in OTP cache 218. In response to the source ID indicated by encrypted packet 455 matching a source ID 425 of a predicted OTP 445 stored in OTP cache 218, one or more instances of encryption circuitry 226 are configured to decrypt the encrypted packet 355 using the predicted OTP 445. As an example, the instance of encryption circuitry 226 performs a XOR operation on at least a portion of the encrypted packet 455 (e.g., a payload of the encrypted packet 455) and the retrieved predicted OTP. In response to the source ID indicated by encrypted packet 455 not matching any source ID 425 of a predicted OTP 445 stored in OTP cache 218, OTP pregeneration circuitry 200 is configured to retrieve a counter value associated with the node 102 indicated by the source ID of encrypted packet 455 from a cache 118, memory 110, or both of the node 102 including OTP pregeneration circuitry 200, one or more other nodes 102 connected to network 104, or both. Using the retrieved counter value and a secret key shared between the node 102 indicated by encrypted packet 455 and the node 102 including OTP pregeneration circuitry 200, one or instances of encryption circuitry 226 decrypt at least a portion of the encrypted packet 455 (e.g., a payload of the encrypted packet 455).

In implementations, OTP pregeneration circuitry 200 is configured to use one or more instances of encryption circuitry 226 associated with OTP cache circuitry 220 to decrypt a received encrypted packet 455. For example, in response to each instance of encryption circuitry 226 currently generating predicted OTPs 445 for sequence learning circuitry 222, one or more instances of encryption circuitry 226 associated with OTP cache circuitry 220 are used to decrypt a received encrypted packet 455. As such, OTP pregeneration circuitry 200 has instances of encryption circuitry 226 ready to decrypt received encrypted packets 455 concurrently with instances of AEX circuitry 226 pregenerating OTPs, reducing the time needed to decrypt the encrypted packets 455.

Figure 5:
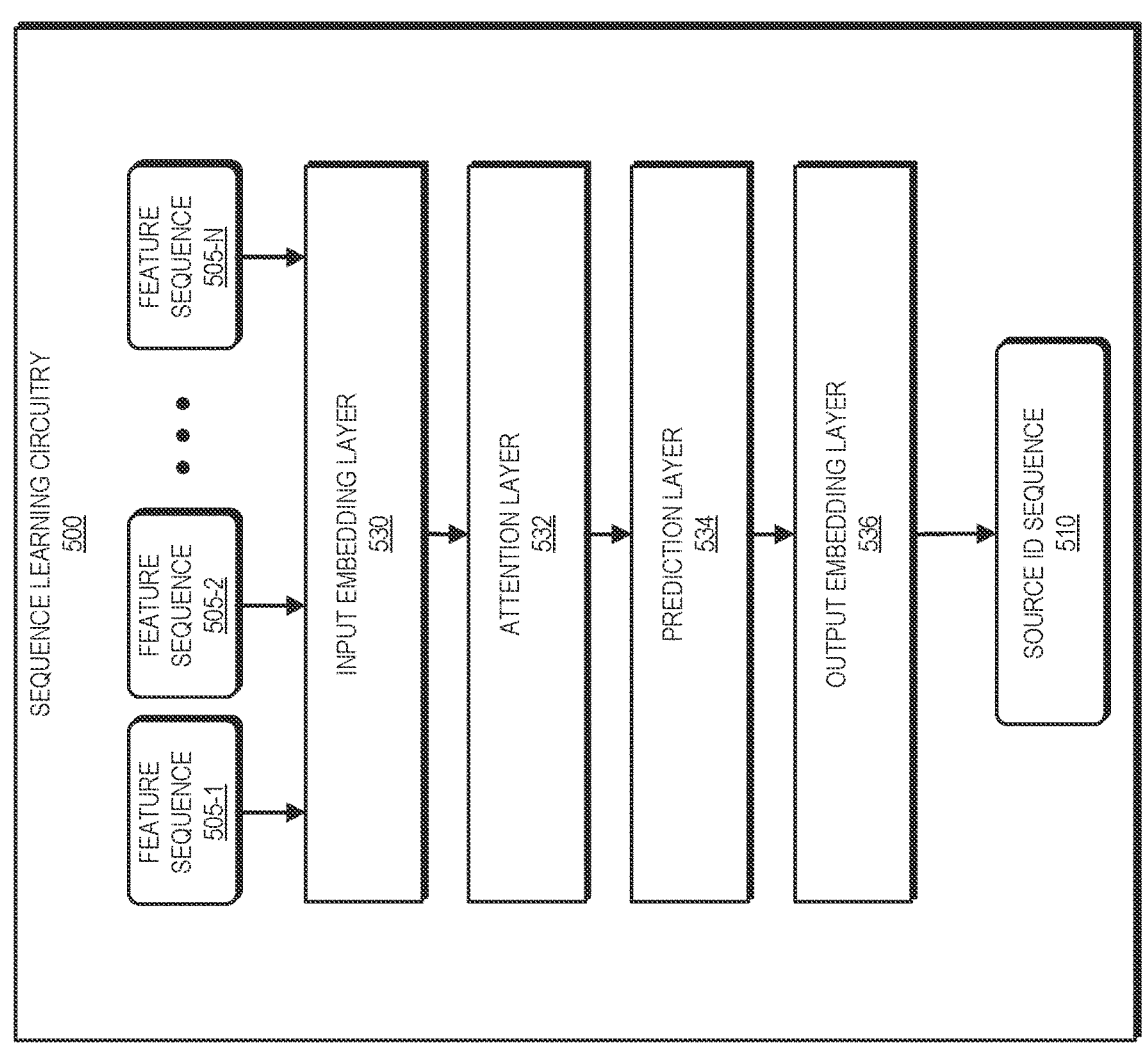
FIG. 5 is a block diagram of an example sequence learning circuitry of an OTP pregeneration circuitry, in accordance with some implementations.

Referring now to FIG. 5, an example sequence learning circuitry 500 is presented, in accordance with some implementations. In implementations, sequence learning circuitry 500, similar to or the same as sequence learning circuitry 222, is configured to predict one or more nodes 102 likely to send an encrypted packet to the node 102 including OTP pregeneration circuitry 200. To this end, sequence learning circuitry 500 includes an input embedding layer configured to receive one or more feature sequences 505 from, for example, logic controller circuitry 228. Such feature sequences 505, for example, each include one or more application features 405 (e.g., virtual page numbers, program counters, cache line offsets, byte offsets, word offsets) associated with a respective application executed by processing system 100. Though the example implementation presented in FIG. 5 shows input embedding layer 530 receiving three feature sequences (505-1, 505-2, 505-N) representing an N number of feature sequences, in other implementations, input embedding layer 530 can receive any number of feature sequences 505. Input embedding layer 530, for example, includes circuitry configured to generate one or more embeddings for each received feature sequence 505. Such embeddings, for example, include fixed-length vectors having a predetermined size that each represents one or application features 405 indicated in a feature sequence 505. To generate embeddings, input embedding layer 530 is configured to generate one or more fixed-length vectors (e.g., dense vectors) having a fixed-size for each application feature 405 in a received feature sequence 505. As an example, to generate a fixed-length vector (e.g., an embedding), input embedding layer 530 is configured to compare each data (e.g., a string) representing each application feature 405 to one or more values in a lookup table stored in a cache 118, memory 110, or both of a node 102 including an OTP pregeneration circuitry 200, another node 102 connected to network 104, or both to identify one or more values associated with each application feature 405. Using the identified values associated with each application feature 405, input embedding layer 530 constructs one or more fixed-length vectors each having a predetermined size.

In response to generating one or embeddings based on one or more received feature sequences 505, input embedding layer 530 provides such embeddings (e.g., fixed-length vectors) to attention layer 532. Attention layer 532, for example, includes circuitry configured to apply weights to one or more values of the embeddings based on one or more attention mechanisms (e.g., scaled dot-product mechanism). These attention mechanisms, for example, include data (e.g., machine-learning models) indicating how weights are to be applied to embeddings (e.g., values of fixed-length vectors) based on a sequence of tokens (e.g., strings) stored in a cache 118, memory 110, or both of a node 102 including an OTP pregeneration circuitry 200, another node 102 connected to network 104, or both. After applying weights to one or more received embedding to produce one or more weighted embeddings, attention layer 532 provides the weighted embeddings to prediction layer 534. Prediction layer 534, for example, includes circuitry configured to determine data identifying one or more other nodes 102 connected to network 104 (e.g., one or more nodes 102 other than the node 102 including OTP pregeneration circuitry 200). To this end, prediction layer 534 includes one or more trained machine-learning models, neural networks, or both configured to receive one or more weighted embeddings as an input and output data identifying one or more other nodes 102. For example, prediction layer 534 includes a trained long short-term memory neural network configured to receive one or more weighted embeddings as an input and output data identifying one or more other nodes 102. After generating data identifying one or more other nodes 102 connected to network 104, prediction layer 534 provides such data to output embedding layer 536.

Output embedding layer 536 includes, for example, circuitry configured to execute one or more activation functions using received data identifying one or more other nodes 102 to generate source ID sequence 510. For example, output embedding layer 536 includes a linear layer configured to perform one or more soft max activation functions using received data identifying one or more other nodes 102 to generate source ID sequence 510. Source ID sequence 510 includes, for example, data (e.g., a vector, matrix) indicating a probability distribution for one or more other nodes 102 indicating, for example, a probability that each node 102 will send an encrypted packet to the node 102 including OTP pregeneration circuitry 200. As an example, source ID sequence 510 includes data (e.g., source IDs) indicating one or more nodes 102 connected to network 104 and a respective probability for each indicated node 102 that represents a likelihood the node 102 will send an encrypted packet to the node 102 including OTP pregeneration circuitry 200. According to implementations, OTP pregeneration circuitry 200 is configured to determine one or more nodes 102 likely to send an encrypted packet by, for example, comparing the probabilities in source ID sequence 510 to a threshold probability (e.g., a predetermined value). In response to a probability being equal to or exceeding the threshold probability, OTP pregeneration circuitry 200 identifies the node 102 indicated by the source ID associated with the probability as being likely to send an encrypted packet. In response to a probability being less than the threshold probability, OTP pregeneration circuitry 200 identifies the node 102 indicated by the source ID associated with the probability as not being likely to send an encrypted packet.

Figure 6:
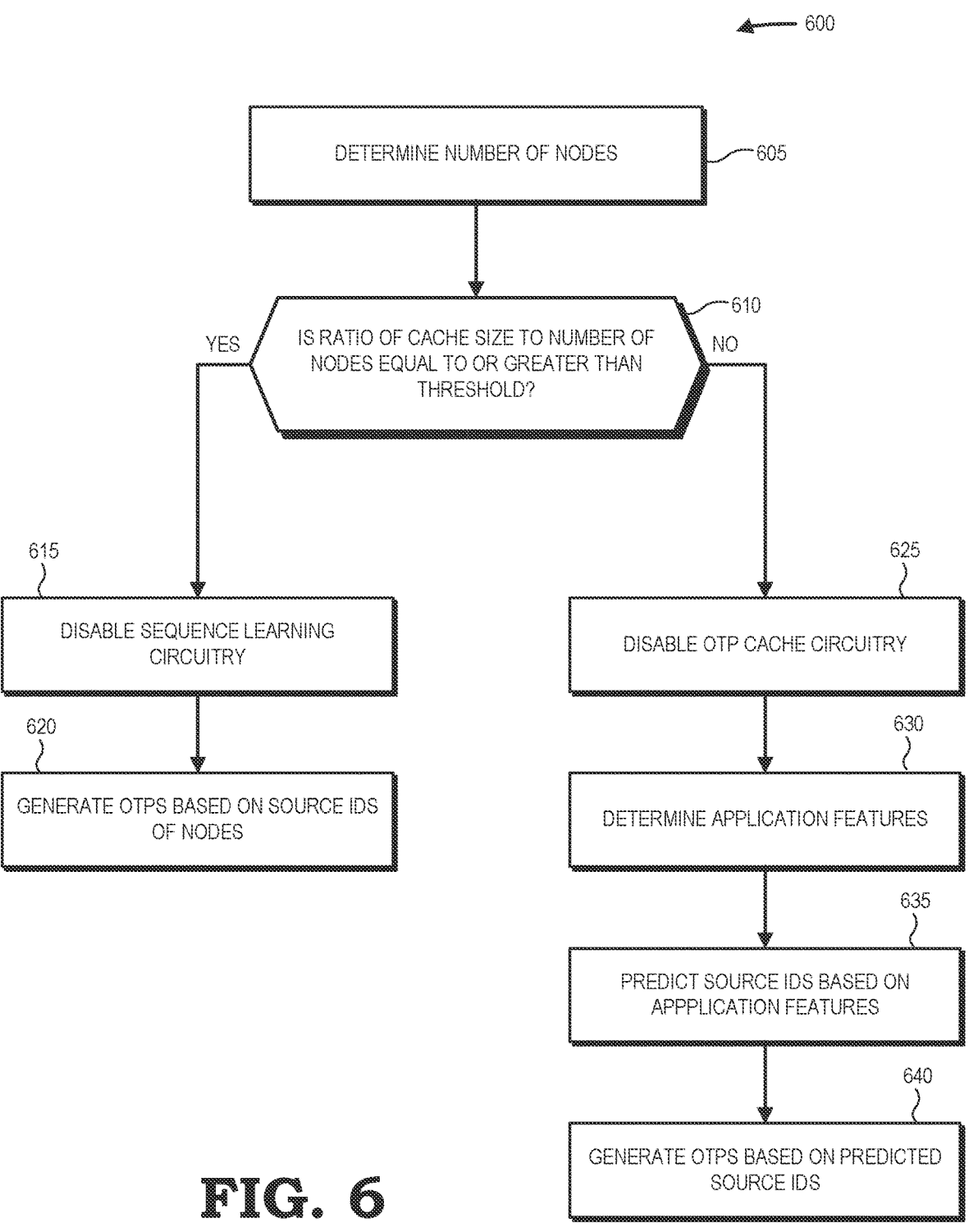
FIG. 6 is a flow diagram of an example method for pregenerating one or more OTPs, in accordance with some implementations.

Referring now to FIG. 6, an example method 600 for pregenerating one or more OTPs is presented, in accordance with some implementations. At step 605 of the example method 600, OTP pregeneration circuitry 200 (e.g., logic controller circuitry 228) determines a number of other nodes 102 connected to network 104 (e.g., the number of nodes 102 other than the node 102 including OTP pregeneration circuitry 200). At step 610, OTP pregeneration circuitry 200 then determines a ratio of a cache size configured to store pregenerated OTPs (e.g., a cache size of OTP cache 218) to the number of other nodes 102 connected to network 104 (e.g., cache size/number of nodes) and compares the ratio to a predetermined threshold value. In response to the ratio of a cache size configured to store pregenerated OTPs to the number of other nodes 102 connected to network 104 being equal to or exceeding the predetermined threshold value, the processing system 100 moves to step 615. At step 615, OTP pregeneration circuitry 200 operates in a cached operating mode 215. Within such a cached operating mode 215 at step 615, OTP pregeneration circuitry 200 (e.g., logic controller circuitry 228) disables a sequence learning circuitry 222 of the OTP pregeneration circuitry 200. At step 620, while still operating in cached operating mode 215, OTP pregeneration circuitry 200 (e.g., OTP cache circuitry 220) generates OTPs for each other node 102 connected to network 104. For example, OTP pregeneration circuitry 200 first retrieves counter values for each other node 102 connected to network 104 from a cache 118, memory 110, or both of the node 102 including OTP pregeneration circuitry 200, another node 102 connected to network 104, or both. OTP pregeneration circuitry 200 then generates an OTP for each other node 102 connected to network 104 based on a counter value associated with the other node 102 and a secret key shared between the other node 102 and the node 102 including OTP pregeneration circuitry 200. After generating one or more OTPs, OTP pregeneration circuitry 200 stores the OTPs in OTP cache 218.

Referring again to step 610, in response to the ratio a cache size configured to store pregenerated OTPs to the number of other nodes 102 connected to network 104 being less than the predetermined threshold value, the processing system 100 moves to step 625. At step 625, OTP pregeneration circuitry 200 operates in a prediction operating mode 225. Within such a prediction operating mode 225 at step 625, OTP pregeneration circuitry 200 (e.g., logic controller circuitry 228) disables an OTP cache circuitry 220 of the OTP pregeneration circuitry 200. At step 630, while in the prediction operating mode 225, OTP pregeneration circuitry 200 is configured to determine one or more application features 405 for one or more applications. For example, OTP pregeneration circuitry 200 is configured to determine one or more virtual page numbers, program counters, cache line offsets, byte offsets, word offsets, or any combination each associated with one or more applications being executed by processing system 100. At step 635, based on the determined application features 405, OTP pregeneration circuitry 200 (e.g., sequence learning circuitry 222) is configured to predict the source IDs of one or more nodes 102 connected to network 104 likely to send an encrypted packet to the node 102 including OTP pregeneration circuitry 200. To this end, OTP pregeneration circuitry 200 is first configured to generate one or more embeddings (e.g., fixed-length vectors having a predetermined length) based on the determined application features 405. For example, OTP pregeneration circuitry 200 compares the determined application features 405 to values in one or more lookup tables to generate the embeddings. OTP pregeneration circuitry 200 then applies one or more weights to the embeddings based on a sequence of tokens (e.g., strings) stored in a cache 118, memory 110, or both of one or more nodes 102 connected to network 104.

After applying such weights, OTP pregeneration circuitry 200 provides the weighted embeddings to one or more trained machine-learning models, neural networks, or both configured to generate data indicating one or more nodes 102 connected to network 104. For example, OTP pregeneration circuitry 200 provides the weighted embeddings to a trained long short-term memory neural network configured to generate data indicating one or more nodes 102 connected to network 104. Using the data indicating one or more nodes 102 connected to network 104, OTP pregeneration circuitry 200 generates a probability distribution that includes, for example, data indicating one or more source IDs and corresponding probabilities for each source ID that indicate a likelihood a node 102 associated with the source ID will send an encrypted packet to the node 102 including OTP pregeneration circuitry 200. As an example, OTP pregeneration circuitry 200 provides the data indicating one or more nodes 102 connected to network 104 to a linear layer including one or more soft max activation functions to determine the probability distribution. From the probability distribution, OTP pregeneration circuitry 200 compares each probability associated with a source ID to a predetermined threshold value to identify one or more nodes 102 that are likely to send an encrypted packet. For example, in response to a probability associated with a source ID being equal to or exceeding a predetermined threshold value, OTP pregeneration circuitry 200 identifies the node 102 indicated by the source ID as likely to send an encrypted packet. At step 640, OTP pregeneration circuitry 200 generates OTPs for each node 102 identified as likely to send an encrypted packet to the node 102 including OTP pregeneration circuitry 200. For example, OTP pregeneration circuitry 200 retrieves counter values for each node 102 identified as likely to send an encrypted packet to the node including OTP pregeneration circuitry 200. OTP pregeneration circuitry 200 then generates an OTP for each node 102 identified as likely to send an encrypted packet based on a counter associated with the node 102 and a secret key shared between the node 102 and the node 102 including OTP pregeneration circuitry 200. After generating the predicted OTPs for each node 102 identified as likely to send an encrypted packet, OTP pregeneration circuitry 200 stores the predicted OTPs in OTP cache 218.

In some implementations, the apparatus and techniques described above are implemented in a system including one or more integrated circuit (IC) devices (also referred to as integrated circuit packages or microchips), such as one or more nodes 102 of processing system 100 described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:
   selecting a one-time pad (OTP) pregeneration operating mode based on a node count representing a number of nodes connected to a network; and
   generating an OTP associated with at least one node of the number of nodes connected to the network based on the selected OTP pregeneration operating mode.

2. The method of claim 1, wherein the OTP pregeneration operating mode is selected based on a comparison of a predetermined threshold to a ratio of a size of a cache to the node count.

3. The method of claim 1, further comprising:
   in response to selecting a cached operating mode, generating a respective OTP for each node of the number of nodes connected to the network.

4. The method of claim 1, further comprising:
   in response to selecting a prediction operating mode, identifying one or more nodes from a plurality of nodes connected to the network based on one or more features of an application executing on a processing system of the network; and
   generating a respective OTP for the identified one or more nodes.

5. The method of claim 1, further comprising:
   in response to receiving a packet from the at least one node of the number of nodes, decrypting at least a portion of the packet based on the OTP associated with the at least one node of the number of nodes.

6. The method of claim 1, further comprising:

generating a second OTP associated with at least one second node of the number of nodes connected to the network concurrently with decrypting at least a portion of a packet.

7. The method of claim 1, further comprising:

retrieving a counter value associated with the at least one node of the number of nodes, wherein the OTP associated with the at least one node of the number of nodes connected to the network is generated based on the counter value.

8. A processor, comprising:

a network interface controller configured to connected to a network; and a one-time pad (OTP) pregeneration circuitry configured to:

select an OTP pregeneration operating mode based on a node count representing a number of nodes connected to the network; and generate an OTP associated with at least one node of the number of nodes connected to the network based on the selected OTP pregeneration operating mode.

9. The processor of claim 8, wherein the OTP pregeneration circuitry is configured to select the OTP pregeneration operating mode based on a comparison of a predetermined threshold to a ratio of a size of a cache to the node count.

10. The processor of claim 8, wherein the OTP pregeneration circuitry is configured to:

in response to selecting a cached operating mode, generate a respective OTP for each node of the number of nodes connected to the network.

11. The processor of claim 8, wherein the OTP pregeneration circuitry is configured to:

in response to selecting a prediction operating mode, identify one or more nodes from the number of nodes connected to the network based on one or more features of an application; and generating a respective OTP for the one or more identified nodes.

12. The processor of claim 8, wherein the OTP pregeneration circuitry is configured to:

in response to receiving a packet from the at least one node of the number of nodes, decrypt at least a portion of the packet based on the OTP associated with the at least one node of the number of nodes.

13. The processor of claim 12, wherein the OTP pregeneration circuitry comprises:

a plurality of instances of encryption circuitry, wherein a first instance of encryption circuitry is configured to generate a second OTP associated with at least one second node of the number of nodes connected to the network and wherein a second instance of encryption circuitry is configured to decrypt at least a portion of a packet concurrently with the first instance of encryption circuitry generating the second OTP.

14. The processor of claim 8, wherein the OTP pregeneration circuitry is configured to:

retrieve a counter value associated with the at least one node of the number of nodes, wherein the OTP associated with the at least one node of the number of nodes connected to the network is generated based on the counter value.

15. A processing system, comprising:

one or more processors connected to a network; and an OTP pregeneration circuitry configured to:

select a one-time pad (OTP) pregeneration operating mode from two or more OTP pregeneration operating modes based on a node count representing a number of nodes connected to the network; and generate an OTP associated with at least one node of the number of nodes connected to the network based on the selected OTP pregeneration operating mode.

16. The processing system of claim 15, wherein the OTP pregeneration circuitry is configured to:

in response to selecting a first OTP pregeneration operating mode of the two or more OTP pregeneration operating modes, generate a respective OTP for each node of the number of nodes connected to the network.

17. The processing system of claim 16, wherein the OTP pregeneration circuitry is configured to:

in response to selecting a second OTP pregeneration operating mode of the two or more OTP pregeneration operating modes, identify one or more nodes from the number of nodes connected to the network based on one or more features of an application executing on the processing system; and generating a respective OTP for the one or more identified nodes.

18. The processing system of claim 15, wherein the OTP pregeneration circuitry is configured to:

in response to receiving a packet from the at least one node of the number of nodes, decrypt at least a portion of the packet based on the OTP associated with the at least one node of the number of nodes.

19. The processing system of claim 15, wherein the OTP pregeneration circuitry comprises:

a plurality of instances of encryption circuitry, wherein a first instance of encryption circuitry is configured to generate a second OTP associated with at least one second node of the number of nodes connected to the network and wherein a second instance of encryption circuitry is configured to decrypt at least a portion of a packet concurrently with the first instance of encryption circuitry generating the second OTP.

20. The processing system of claim 15, wherein the OTP pregeneration circuitry is configured to:

retrieve a counter value associated with the at least one node of the number of nodes, wherein the OTP associated with at least one node of the number of nodes connected to the network is generated based on the counter value.

* * * * *